United States Patent
Levy et al.

(10) Patent No.: US 7,801,161 B2
(45) Date of Patent: Sep. 21, 2010

(54) GIGABIT PASSIVE OPTICAL NETWORK (GPON) RESIDENTIAL GATEWAY

(75) Inventors: Gil Levy, Herzliya (IL); Eliezer Weitz, Holon (IL); Michael Balter, Tel-Aviv (IL); Ifat Naaman, Ra'anana (IL); Asaf Koren, Herzliya (IL)

(73) Assignee: Broadlight, Ltd., Ramat-Gan (IL)

( * ) Notice: Subject to any disclaimer, the term of this patent is extended or adjusted under 35 U.S.C. 154(b) by 78 days.

(21) Appl. No.: 12/254,187

(22) Filed: Oct. 20, 2008

(65) Prior Publication Data
US 2010/0098419 A1    Apr. 22, 2010

(51) Int. Cl.
*H04L 12/28* (2006.01)
*H04L 12/56* (2006.01)
*H04J 3/16* (2006.01)
*H04J 14/00* (2006.01)
*H04B 10/20* (2006.01)

(52) U.S. Cl. .................. 370/401; 370/412; 370/468; 398/63; 398/67

(58) Field of Classification Search ......... 370/230–237, 370/352–359, 389–419; 398/58–98; 709/224–229
See application file for complete search history.

(56) References Cited

U.S. PATENT DOCUMENTS

| | | | |
|---|---|---|---|
| 6,272,134 B1 | 8/2001 | Bass et al. | |
| 7,379,676 B2 * | 5/2008 | Kang et al. | 398/168 |
| 7,385,995 B2 * | 6/2008 | Stiscia et al. | 370/412 |
| 7,643,753 B2 * | 1/2010 | Weitz et al. | 398/67 |
| 2002/0120758 A1 | 8/2002 | Chang | |
| 2004/0136712 A1 | 7/2004 | Stiscia et al. | |
| 2004/0202470 A1 | 10/2004 | Lim et al. | |
| 2006/0083253 A1 | 4/2006 | Park et al. | |
| 2007/0065089 A1 | 3/2007 | Matsuoka et al. | |
| 2007/0133424 A1 * | 6/2007 | Brolin et al. | 370/249 |
| 2007/0133989 A1 * | 6/2007 | Kim et al. | 398/69 |
| 2007/0201872 A1 | 8/2007 | Yim et al. | |
| 2007/0211763 A1 * | 9/2007 | Solomon et al. | 370/498 |
| 2007/0274718 A1 * | 11/2007 | Bridges et al. | 398/63 |
| 2007/0297446 A1 * | 12/2007 | Siwko et al. | 370/468 |
| 2008/0273878 A1 * | 11/2008 | Wu et al. | 398/67 |
| 2009/0060530 A1 * | 3/2009 | Biegert et al. | 398/214 |
| 2009/0109972 A1 | 4/2009 | Chen | |

* cited by examiner

*Primary Examiner*—Man Phan
(74) *Attorney, Agent, or Firm*—Myers Wolin, LLC

(57) ABSTRACT

A gigabit passive optical network (GPON) residential gateway comprising a microprocessor for at least processing packets including voice data and packets including video data; dual packet processors for performing GPON and residential gateway processing tasks; a plurality of Ethernet media access control (MAC) adapters for interfacing with a plurality of subscriber devices; a GPON MAC adapter for interfacing with an optical line terminal (OLT) of the GPON; and a digital signal processor (DSP) for processing voice signals.

13 Claims, 6 Drawing Sheets

GIGABIT PASSIVE OPTICAL NETWORK (GPON) RESIDENTIAL GATEWAY

TECHNICAL FIELD

The present invention relates generally to communication using passive optical networks (PONs), and more particularly to implementing a PON residential gateway on a single integrated circuit.

BACKGROUND OF THE INVENTION

As the demand from users for bandwidth is rapidly increasing, optical transmission systems, where subscriber traffic is transmitted using optical networks, is installed to serve this demand. These networks are typically referred to as fiber-to-the-curb (FTTC), fiber-to-the-building (FTTB), fiber-to-the-premise (FTTP), or fiber-to-the-home (FTTH). Each such network provides access from a central office (CO) to a building, or a home, via optical fibers installed near or up to the subscribers' locations. As the transmission bandwidth of such an optical cable is much greater than the bandwidth actually required by each subscriber, a passive optical network (PON), shared between a plurality of subscribers through a splitter, was developed.

An exemplary diagram of a typical PON 100 is schematically shown in FIG. 1. The PON 100 includes M optical network units (ONUs) 120-1 through 120-M, coupled to an optical line terminal (OLT) 130 via a passive optical splitter 140. Traffic data transmission may be achieved by using two optical wavelengths, one for the downstream direction and another for the upstream direction. Downstream transmission from the OLT 130 is broadcast to all ONUs 120. Each ONU 120 filters its respective data according to, for example, pre-assigned labels. ONUs 120 transmit respective data to OLT 130 during different time slots allocated by OLT 130 for each ONU 120. Splitter 140 splits a single line into multiple lines, for example, 1 to 32, or, in case of a longer distance from OLT 130 to ONUs 120, 1 to 16.

The Gigabit PON (GPON) is an emerging standard currently being adopted by many telecommunication companies in order to deliver high-speed data services to their subscribers. These services typically include a bundle of TV broadcasting, Internet, and telephone services.

To provide these services an ONU 120 is connected to a residential gateway installed in the premises. As illustrated in FIG. 2 an input of a residential gateway 210 is connected to the ONU 120. The gateway's 210 outputs are coupled to, for example, a telephone device 220, a TV set-top box 230, and a computer 240 to provide Internet connectivity. Generally, a residential gateway may provide the functionality of a modem and router and may be, for example, a cable modem, a router, a switch, a wireless modem, a wireless router, and so on.

As can be recognized from the installment configuration depicted in FIG. 2, a telecommunication company would install and support two devices to provide high speed data services. Obviously, this is a costly solution. In addition, the current installment configuration limits the services and features that can be offered to subscribers.

Therefore, it would be advantageous to provide an apparatus that integrates the functionality of both a residential gateway and an ONU.

SUMMARY OF THE INVENTION

Certain embodiments of the invention include a gigabit passive optical network (GPON) residential gateway. The GPON residential gateway comprises a microprocessor for at least processing packets including voice data and packets including video data; dual packet processors for performing GPON and residential gateway processing tasks; a plurality of Ethernet media access control (MAC) adapters for interfacing with a plurality of subscriber devices; a GPON MAC adapter for interfacing with an optical line terminal (OLT) of the GPON; and a digital signal processor (DSP) for processing voice signals.

Certain embodiments of the invention also include a method for processing gigabit passive optical network (GPON) downstream traffic by a GPON residential gateway, wherein the downstream traffic includes a bundle of high speed data services. The method comprises receiving data fragments of a data packet sent from the an optical line terminal (OLT) of a GPON; reassembling said data fragments into a packet; performing residential gateway processing on the reassembled packet; and forwarding the processed packet to a destination subscriber device through a Ethernet MAC adapter.

Certain embodiments of the invention further include a method for processing gigabit passive optical network (GPON) upstream traffic by a GPON residential gateway, wherein the GPON upstream traffic include a bundle of high-speed data services. The method comprises receiving data chucks of an Ethernet packet sent from a subscriber device; reassembling said data chucks into a packet; queuing the reassembled packet in a queue of a traffic container (T-CONT); and upon receiving a grant from an OLT, transmitting the reassembled packet to an optical lime terminal.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
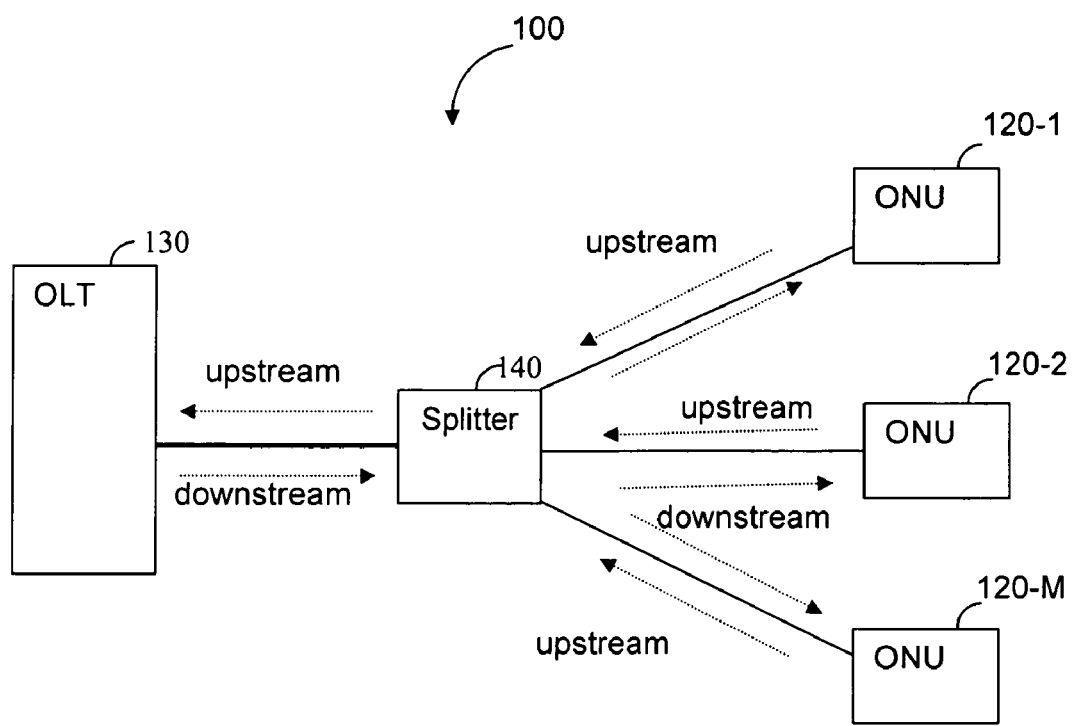
FIG. 1 is an exemplary diagram of a PON.
Figure 2:
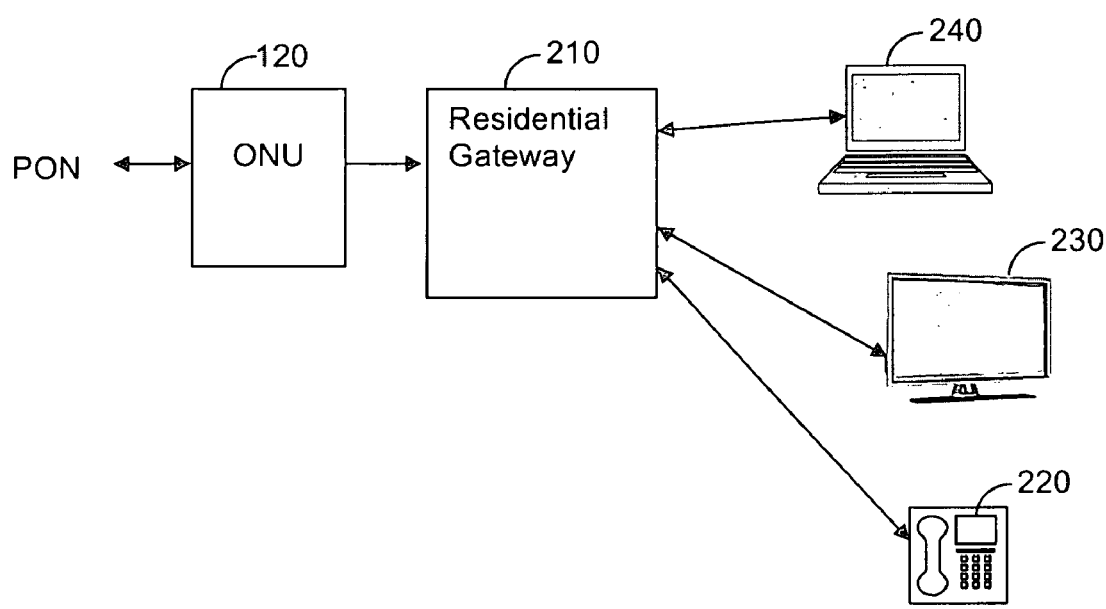
FIG. 2 shows a typical installation of a residential gateway connected to an ONU.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
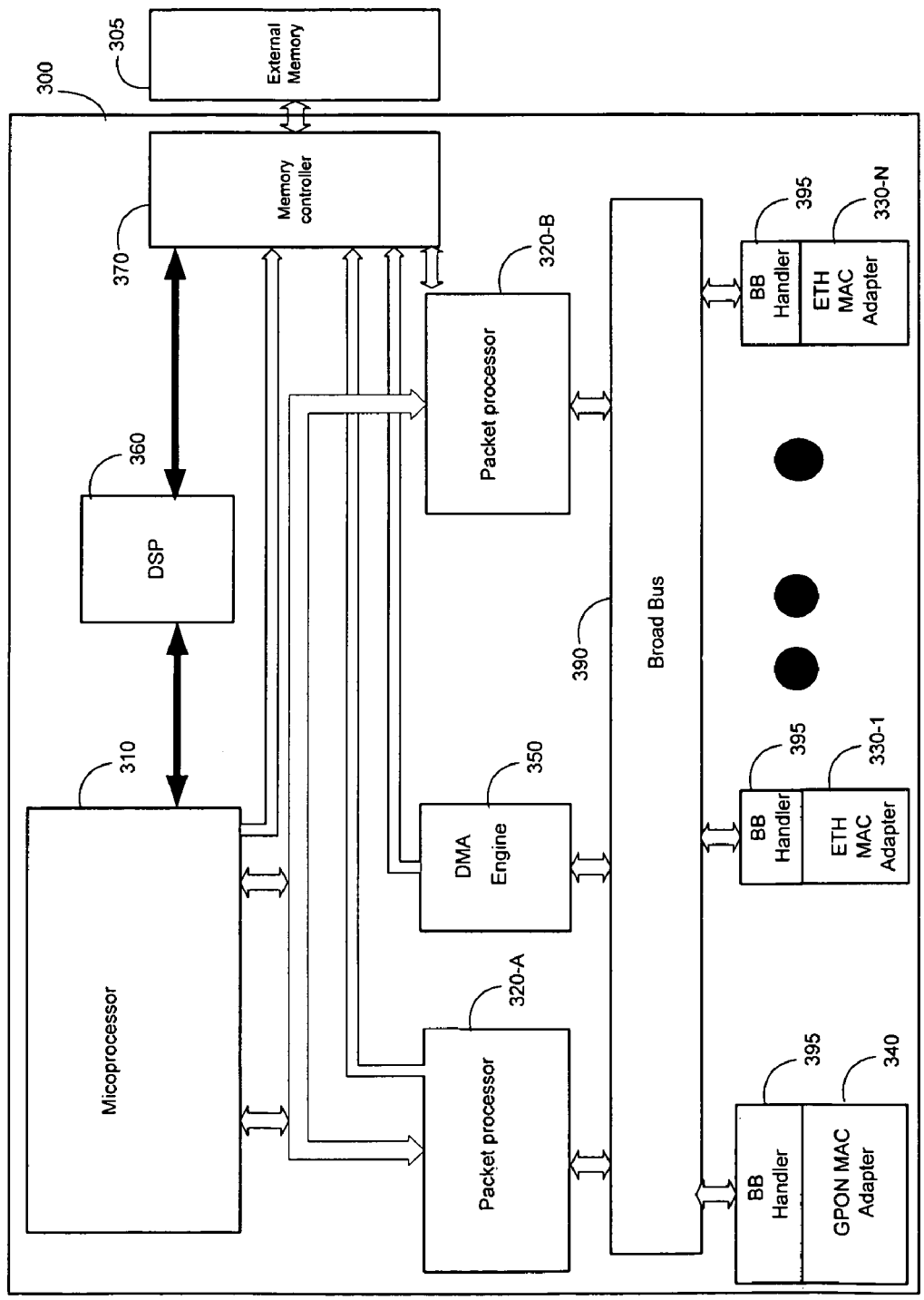
FIG. 3 is a diagram of the GPON residential gateway realized in accordance with an embodiment of the present invention.

FIG. 3 shows a non-limiting and exemplary block diagram of a GPON residential gateway 300 constructed in accordance with an embodiment of the present invention. The GPON residential gateway 300 includes a microprocessor 310, dual packet processors 320-A and 320-B, a plurality of Ethernet media access control (MAC) adapters 330-1 through 330-N, a GPON MAC adapter 340, a direct memory access (DMA) engine 350, a digital signal processor (DSP) 360, and a memory controller 370 that interacts with an external memory 305. An internal bus allows the communication between the microprocessor 310 and the packet processors 320, while a broad bus 390 connects between the packet processors 320-A and 320-B, the Ethernet adapters 330-1 through 330-N and the GPON MAC adapter 340.

The broad bus 390 transfers data at high rates and its architecture is based on a push-ahead mechanism, using a binary tree topology. The broad bus 390 supports parallelism in read and write transactions and allows simultaneous transfer of data from various units at the same time. A detailed description of the broad bus 390 can be found in U.S. Pat. No. 7,370,127 assigned in common to the same assignee as the present application, and which is hereby incorporated for all that it contains. In a preferred embodiment, the broad bus 390 communicates with the various components using broad bus handlers 395.

The microprocessor 310 executes commands received from the packet processors 320-A and 320-B. The microprocessor 310 performs fast processing, where the execution of each command is completed in one clock cycle. In an exemplary embodiment of the present invention, the microprocessor 310 may be a high-performance MIPS microprocessor including at least an instruction cache and a data cache.

Each of the Ethernet MAC adapters 330-1 through 330-N includes an Ethernet interface for interfacing with subscriber devices, such as computers, setup boxes, wireless devices, and so on. An Ethernet MAC adapter 330-N is capable of receiving upstream data flow from subscribe devices and transmitting downstream data to subscribers. Either upstream or downstream data flows are respectively forwarded to or received from the packet processors 320-A and 320-B via the broad bus 390. More specifically, the Ethernet MAC adapter 330 in the downstream direction handles IPTV packets, such packets encapsulate video data of a program being broadcasted. In addition, downstream data includes IP packets received from a WAN (through the GPON adapter 340) and are bridged routed, through an Ethernet MAC adapter to one of the computers of a LAN. The routing is performed by one of the packet processors 320-A and 320-B. Upstream data includes packets received, through the Ethernet MAC adapter 330 from computers connected to a LAN. The processes of handling upstream and downstream traffic described in detail below.

The GPON MAC adapter 340 is capable of processing upstream and downstream traffic in accordance with the GPON standard. The GPON standard is designed to allow data transmission at a rate of up to 2.488 Gbps while ensuring data security and quality of service (QoS). The GPON MAC 340 supports a plurality of traffic containers (T-CONTs). A T-CONT is a virtual upstream channel to which bandwidth is granted by the OLT. A single T-CONT can be allocated for an ONU, a class of service (CoS), or a logical ONU.

The DSP 360 is the handler of voice services and provides an interface to a telephone device connected to the gateway 300. The DSP 360 is adapted to receive and send voice samples from and to the telephone devices. Specifically, analog voice signals received from a telephone device are sampled by the DSP 360 and saved in the external memory 305. These samples are further processed by the microprocessor 310, which generates IP packets to include the voice data. Similarly, the microprocessor 310 processes input IP packets including voice data and stores the processed packets in the memory 305. The DSP 360 retrieves the data packets from the memory and generates voice signals which are sent to the telephone device. The microprocessor 310 further processing IP-TV packets, i.e., packets that include video data.

Figure 4:
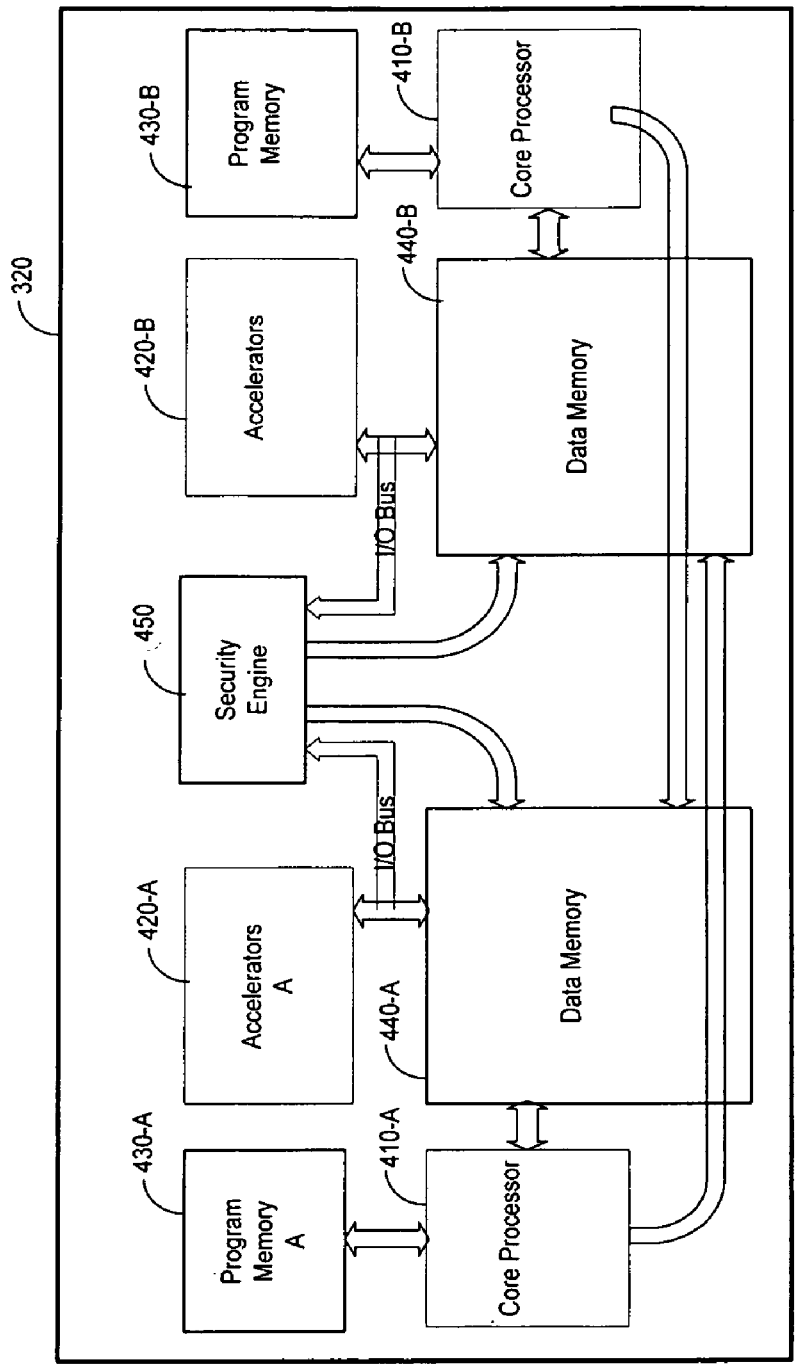
FIG. 4 is a diagram of the packet processor disclosed in accordance with an embodiment of the present invention.

Each of the packet processor 320-A and 320-B is adapted to perform GPON as well as residential gateway processing tasks. The GPON processing tasks include bridge learning, managing of T-CONTs, reassembling of packets, and so on. The residential gateway processing tasks include, encrypting/decrypting packets, blocking unauthorized access, routing of packets, switching packets, network address translation (NAT), firewall, and so on. Data processed by a packet processor 320-A and 320-B may be either an upstream flow, i.e., data sent from a subscriber device to an OLT or a downstream flow, i.e., data sent from an OLT to a subscriber device. FIG. 4 shows an exemplary block diagram of a packet processor 320-A or 320-B constructed in accordance with an exemplary embodiment of the present invention.

The packet processor 320 of FIG. 4 includes dual core processors 410-A and 410-B, each core processor 410 is coupled to a set of (HW) accelerators 420-A and 420-B, data memory units 440-A and 440-B a program memory unit 430-A and 430-B. A security engine 450 provides security services to both core processes 410-A and 410-B. Each of the core processors 410 may be, for example, a RISC processor that designed to execute processing tasks with a minimal latency. For this purpose, all arithmetic and logic operations as well as source and destinations variables are registers based. The only operations that require access to the data memory 430 are load and store operations. Furthermore, the core processor 410 is designed with separate channels utilized for program and data accesses. The program memory 430 is a read only memory that holds tasks' instructions and accessible by the microprocessor 310 of FIG. 3. The data memory 440-A or 440-B is a read/write memory that keeps data of the various tasks and instances of registers used by respective core processor 410-A and 410-B.

The HW accelerators 420 are dedicated hardware processing components designed to increase the packet processor 320's performance by speeding up time consuming tasks. These dedicated processing components include at least one of a lookup table, a scheduler, a register file, a direct memory access (DMA), a classifier, a board bus interface, an IP checksum calculator, an external memory lookup engine, Semaphores for synchronization between the two packet processors 320, and general purpose timers for different time counting tasks, such as rate limiting.

A lookup table accelerator maintains MAC addresses used for accessing both GPON and Ethernet MAC adapters 340 and 330. A CRC accelerator enables the fast CRC calculation for data received through the PON. The CRC accelerator operates off line on data stored in data memory 430. The scheduler receives requests from the different request generators and determines the next thread number when a context switch is triggered. The next thread is selected according to a predefined priority policy. The DMA accelerator is responsible for data transfer from and to the data memory 430 and an external memory. The register file includes all configuration and input/output (I/O) space register. Configuration registers can be read and written by the microprocessor 310 of FIG. 3, while the input/output (I/O) registers are for the core processor 410 internal uses. The classifier accelerator parses a packet's header and generates a data structure that includes useful information in the packet's header. The data structure is in a format that allows a core processor 410 a fast access to a packet's fields required for the processing. The classifier also determines based on a packet's header which residential gateway processing tasks are required. The packet is processed by one of the core processors 410-A or 410-B according to the classification.

The security engine 450 provides a mechanism for IP security (IPsec) processing by implementing HW accelerators for decrypting, encrypting and authentication of packets. The encryption/decryption and authentication algorithms supported by the security engine 450 include, but are not limited to, AES, 3DES, SHA-1 and MD-5, and the like.

Figure 5:
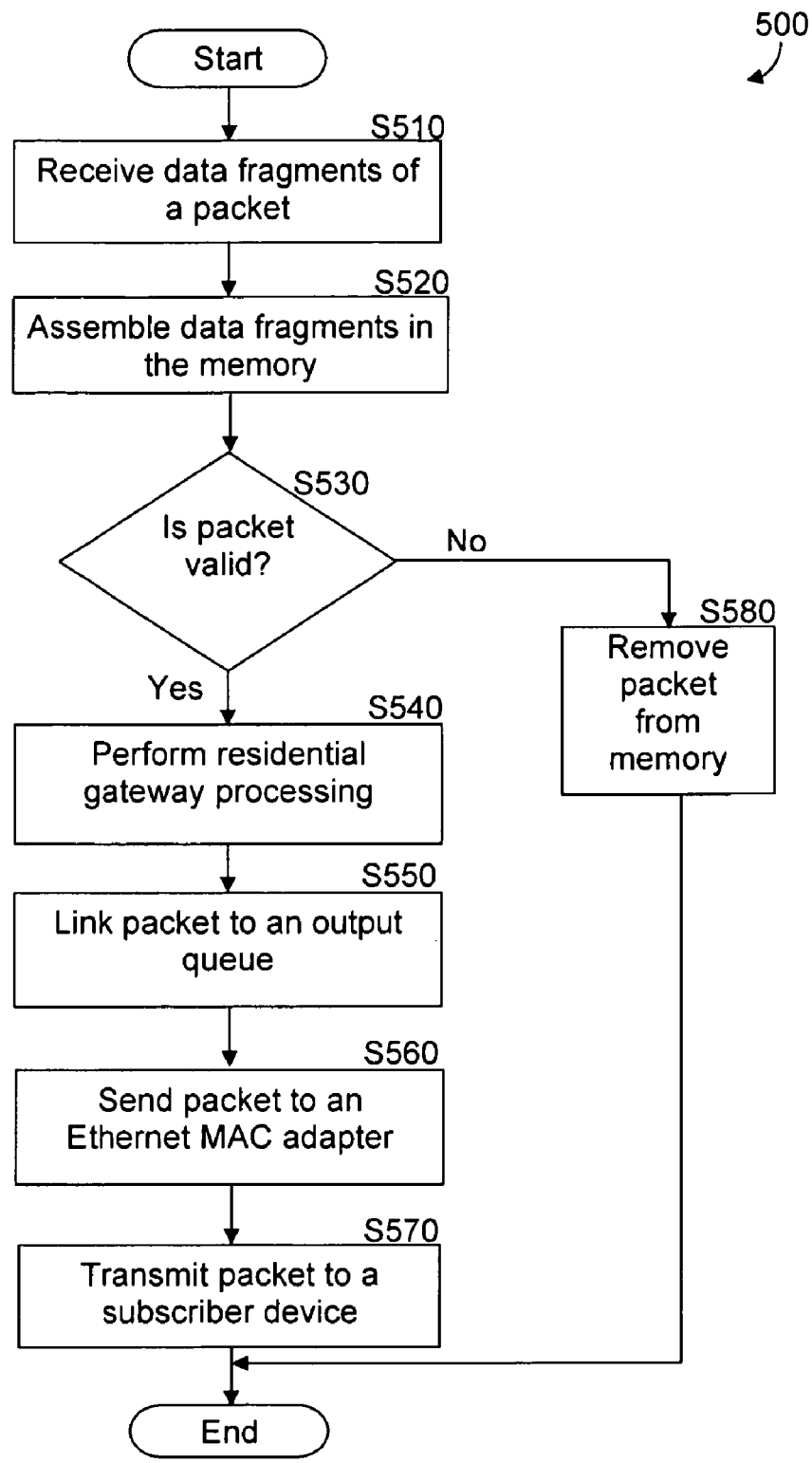
FIG. 5 is a flowchart describing an exemplary process for handling downstream data realized in accordance with an embodiment of the present invention.

FIG. 5 shows a non-limiting and exemplary flowchart 500 useful in describing the process for handling downstream data packets realized in accordance with an embodiment of the present invention. A downstream packet is received on the GPON MAC adapter 340 and output on one of the Ethernet MAC adapters 330. At S510, an incoming packet is received as data fragments at the GPON MAC adapter 340. At S520, incoming data fragments are assembled in the external memory 305. This is performed by a board bus adapter 395 interfacing between the broad bus 390 and the GPON MAC adapter 340 (see FIG. 3). Data fragments are sent to the external memory 305 through the DMA engine 350. While assembling the data fragments, validity checks are performed on the assembled packet. These checks include at least CRC and length checks. At S530, it is determined if the assembled packet is valid, and if so execution continues with S540, otherwise, at S580, the packet is removed from the board bus adapter 395 and execution ends.

At S540, the assembled packet now stored in the external memory 305 is processed by one of the packet processors 320-A or 320-B. This step includes assigning a packet description (DS) to the packet, classifying the packets according to their header, and a performing a residential gateway processing task according to the classification's results. The residential processing task may include, for example, switching a packet, decrypting a packet, mapping a packet to another address, queuing a packet, and so on. It is appreciated that these tasks are traditionally performed by a residential gateway. Once the packet processing is completed, at S550 the packet descriptor is linked with an output queue associated with a destination Ethernet MAC adapter 330. Once the packet processor 320 writes the packet descriptor to the output queue, a new incoming packet can be handled by the processor 320. At S560 the destination Ethernet MAC adapter 330 retrieves data chunks from the external memory 305 using the packet description. The access to the external memory is through a respective broad bus handler 395 and the DMA engine 350. At S570 upon reception of the entire packet, at the Ethernet MAC adapter 330 the packet is being transmitted to the subscriber device connected to the adapter 330. It should be noted that each packet processor 320 supports a pipeline architecture, thus at any specific time more than one packet is being processes. In addition, a packet processor 320 does not require completing the processing of a packet before starting to process the next packet.

Figure 6:
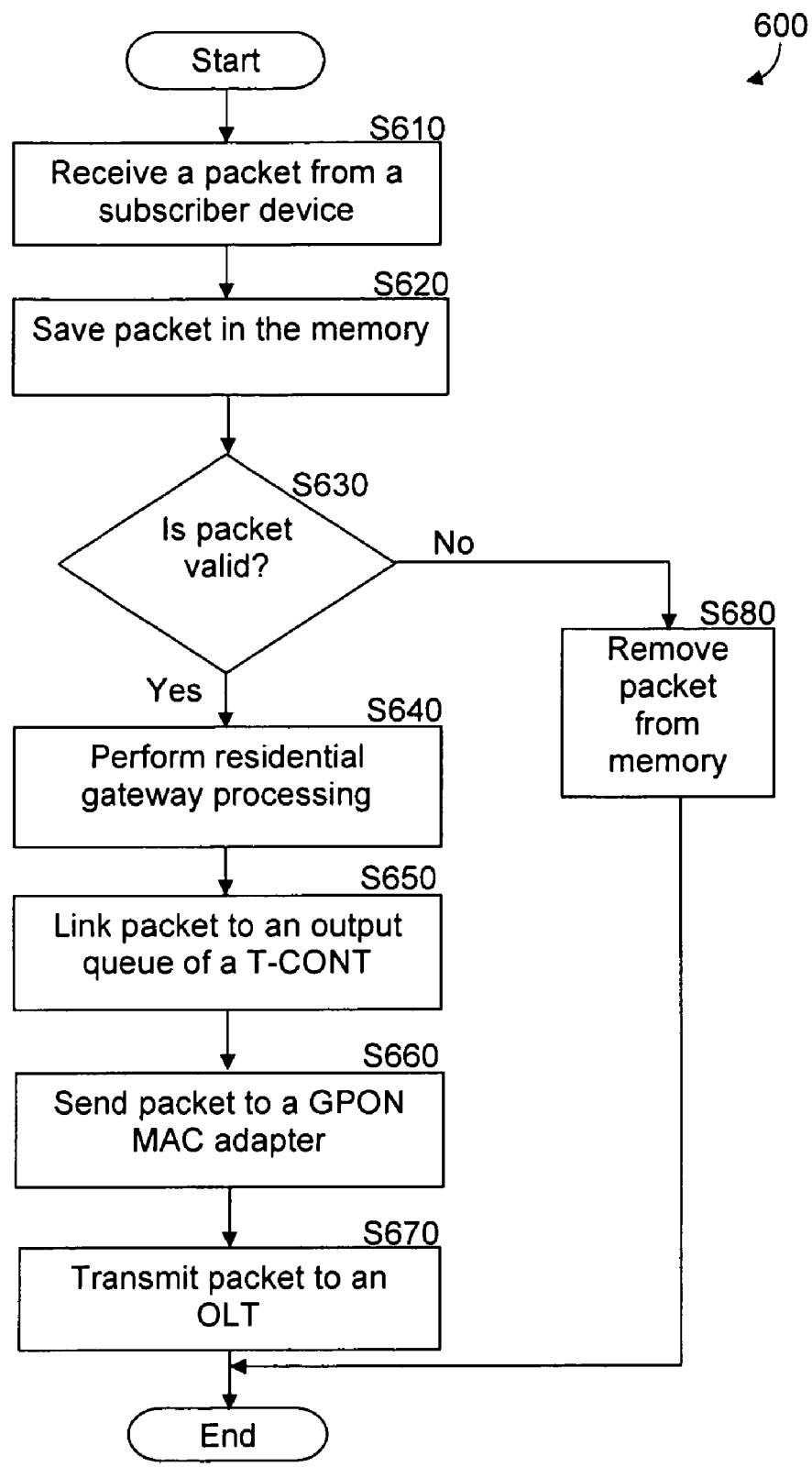
FIG. 6 is a flowchart describing an exemplary process for handling upstream data realized in accordance with an embodiment of the present invention.

FIG. 6 shows a non-limiting and exemplary flowchart 600 useful in describing the process for handling upstream data realized in accordance with an embodiment of the invention. At S610, an incoming packet at the Ethernet MAC adapter 330 is received (see FIG. 3). At S620, the data packet is saved in the external memory 305. The packet is sent through a respective board bus adapter 395 of the Ethernet MAC adapter 330 and the DMA engine 350. During the transfer of the data packet to the external memory 305, validity checks are performed on the assembled packet. These checks include at least CRC and length checks. At S630, it is determined if the incoming packet is valid, and if so execution continues with S640, otherwise, at S680, the data packet is deleted from the external memory 305.

At S640, the data packet now stored in the external memory is processed by one of the packet processors 320. This step includes assigning a packet description (DS) to the packet, classifying the packet according to its header, determining which residential gateway processing task is required, and performing the processing task according to the classification's results. A residential gateway processing task may be, for example, routing a packet, switching a packet, encrypting a packet, mapping a packet, or queuing a packet. It is appreciated that these tasks are traditionally performed by a residential gateway. Once the packet processing is completed, at S650 the packet descriptor is linked with an output queue which belongs to a specific T-CONT. The GPON MAC adapter 340 maintains T-CONT queues as the number of T-CONTs and cyclically requests for packets in order to fill a specific T-CONT queue. At S660, data chunks of the processed packet are sent from the external memory 305 and to the GPON MAC adapter 340 and saved in the specific T-CONT's queue. The access to the external memory is through a respective broad bus handler 395 and the DMA engine 350. At S670 once the entire packet is received at the GPON MAC adapter 340 the packet is being transmitted to the OLT.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention. Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What we claim is:

1. A gigabit passive optical network (GPON) residential gateway, comprising:
    a microprocessor for at least processing packets including voice data and packets including video data;
    dual packet processors for performing GPON and residential gateway processing tasks;
    a plurality of Ethernet media access control (MAC) adapters for interfacing with a plurality of subscriber devices;
    a GPON MAC adapter for interfacing with an optical line terminal (OLT) of the GPON;
    a digital signal processor (DSP) for processing voice signals;

a broad bus for enabling fast communication to the dual packet processors, the plurality of Ethernet MAC adapters, and the GPON adapter;

a memory controller for interfacing with an external memory; and a dual memory access coupled between the broad bus and the memory controller.

2. The GPON residential gateway of claim 1, wherein the GPON residential gateway supports a bundle of high speed data services.

3. The GPON residential gateway of claim 2, wherein the high speed data services includes at least data, voice, and video.

4. The GPON residential gateway of claim 1, wherein said microprocessor completes the execution of a single processing task in a single clock cycle.

5. The GPON residential gateway of claim 1, wherein the subscriber devices include at least one of: a telephone device, a computer, a set-top box.

6. The GPON residential gateway of claim 1, wherein the GPON processing tasks carried by the dual packet processors include at least: bridge learning, queuing packets, shaping packets, and reassembling of packets.

7. The GPON residential gateway of claim 1, wherein the residential gateway processing tasks carried by the dual packet processors include at least: encrypting packets, decrypting packets, switching packets, bridging packets, blocking unauthorized access, and translating network addresses.

8. The GPON residential gateway of claim 7, wherein each of the dual packet processors comprising at least: dual core processors; a plurality of hardware (HW) accelerators; and a memory unit.

9. The GPON residential gateway of claim 8, wherein the plurality of hardware (HW) accelerators include: a lookup table, a cyclical redundancy checking (CRC) accelerator, a scheduler, a register file, a direct memory access (DMA), a board bus interface, a security engine, and a classifier.

10. The GPON residential gateway of claim 2, is fabricated of on a single integrated circuit (IC).

11. A method for processing gigabit passive optical network (GPON) downstream traffic by a GPON residential gateway, wherein the downstream traffic includes a bundle of high speed data services, comprising:

receiving data fragments of a data packet sent from the an optical line terminal (OLT) of a GPON;

reassembling said data fragments into a packet;

performing residential gateway processing on the reassembled packet;

forwarding the processed packet to a destination subscriber device through a Ethernet MAC adapter;

determining a residential gateway processing task required for the classified packet; and processing the packet according the required processing task, wherein the required processing task includes at least any of decrypting the packet, switching the packet, bridging the packet, and blocking the packet.

12. The method of claim 11, wherein performing residential gateway processing of the packet further comprising:

classifying the packet using a header of the packet.

13. The method of claim 11, further comprising:

checking correctness of said reassembled packets.

* * * * *